(12) United States Patent
Wang et al.

(10) Patent No.: US 12,536,576 B2
(45) Date of Patent: Jan. 27, 2026

(54) METHOD, MEDIUM, AND SYSTEM FOR SCORING IMPROVEMENTS BY TEST FEATURES TO USER INTERACTIONS WITH ITEM GROUPS

(71) Applicant: Maplebear Inc., San Francisco, CA (US)

(72) Inventors: Shitao Wang, Redmond, WA (US); Apurvaa Subramaniam, Renton, WA (US); Nicholas George Gordenier, Georgetown, CO (US)

(73) Assignee: Maplebear Inc., San Francisco, CA (US)

( * ) Notice: Subject to any disclaimer, the term of this patent is extended or adjusted under 35 U.S.C. 154(b) by 506 days.

(21) Appl. No.: 18/047,990

(22) Filed: Oct. 19, 2022

(65) Prior Publication Data

US 2024/0135423 A1 Apr. 25, 2024
US 2024/0232976 A9 Jul. 11, 2024

(51) Int. Cl.
*G06Q 30/0601* (2023.01)
(52) U.S. Cl.
CPC ................ *G06Q 30/0631* (2013.01)
(58) Field of Classification Search
CPC ......... G06Q 30/0631; G06Q 30/06311; G06Q 30/06312; G06Q 30/06313; G06Q 30/06314; G06Q 30/06315; G06Q 30/0601–0645
See application file for complete search history.

(56) References Cited

U.S. PATENT DOCUMENTS

| | | | |
|---|---|---|---|
| 2020/0183988 A1* | 6/2020 | Vasthimal | G06F 9/451 |
| 2021/0035163 A1* | 2/2021 | Peris | G06Q 30/0243 |
| 2022/0067754 A1* | 3/2022 | Gong | G06Q 10/0833 |
| 2024/0070743 A1* | 2/2024 | Raj | G06Q 30/0205 |

OTHER PUBLICATIONS

Sergey Gitlin et al., Supercharging A/B Testing at Uber, Uber, Data, ML, Engineering, Jul. 21, 2022 (Year: 2022).*

\* cited by examiner

*Primary Examiner* — Marissa Thein
(74) *Attorney, Agent, or Firm* — Fenwick & West LLP (57) ABSTRACT

An online concierge system generates an aggregated lift score for a test feature for the online concierge system. The online concierge presents prioritized items from a set of item groups to two sets of users: a test set and a control set. The online concierge system uses the test feature to present prioritized items to users in the test set, and the online concierge system uses existing functionality to present prioritized items to users in the control set. For each test group, the online concierge system creates holdout subsets out of the test set and the control set. The online concierge system tracks user interactions with items in an item group and computes a group lift score for the item group. The online concierge system generates an aggregated lift score for the test feature based on the group lift scores and presents items to users based on the aggregated lift score.

20 Claims, 5 Drawing Sheets

METHOD, MEDIUM, AND SYSTEM FOR SCORING IMPROVEMENTS BY TEST FEATURES TO USER INTERACTIONS WITH ITEM GROUPS

BACKGROUND

An online concierge system is an online system by which users can order items to be provided to them. Some online concierge systems use sophisticated algorithms and machine-learning models to determine which items to present to a user who is selecting items to order. Over time, these algorithms and models may be changed when a new feature is added to the online concierge system. A new feature may be a new algorithm or model to be used by the online concierge system to select items to present to users, or may be one or more new parameters for existing algorithms or models. With sophisticated systems like online concierge systems, it can be difficult to predict how these new features will impact user interactions with items. Thus, an online concierge system may test the performance of the new feature by using it to present items to a test set of users.

Some online concierge systems allow item providers to provide groups of items to the online concierge system to present to users. These item groups may include items that are produced or sold by the item provider that the item provider wants the online concierge system to prioritize when selecting items to present to users. For example, an item provider may provide an item group with a set of new items that the item provider is offering, and may provide the item group to the online concierge system so that the online concierge system prioritizes the presentation of the item provider's new items to users. When an item is displayed as part of an item group, the online concierge system presents the item alongside other items, but with an indication that the item is part of an item group. For example, the item may be presented with an indication that the item is "new" or "special."

A new feature may be targeted at improving user interactions with items presented as part of an item group. However, traditional feature testing methodologies are generally ineffective at testing the efficacy of presenting items from item groups. These testing methodologies may tend to quantify improvements in user interactions with a single item or by items in a single item group. However, these methodologies are unable to quantify how a new feature would impact user interactions with items presented as parts of item groups at a more general level. These shortcomings may inhibit the ability of online concierge systems to improve their presentation of items as part of item groups.

SUMMARY

In accordance with one or more aspects of the disclosure, an online concierge system generates an aggregated lift score that represents a change in the level of interaction by users with items in item groups caused by a test feature.

The online concierge system presents prioritized items to a set of users. Prioritized items, as used herein, are items that are in an item group and are prioritized in their presentation to users. To test a feature, the online concierge system presents prioritized items from a set of item groups to two sets of users: a test set and a control set. The online concierge system uses the test feature to present prioritized items to users in the test set, and the online concierge system uses existing functionality to present prioritized items to users in the control set. However, for each test group, the online concierge system creates holdout subsets out of the test set and the control set. The online concierge system does not present any prioritized items to users of the holdout subsets of the corresponding item group, though items in the item group may be presented to users in the holdout subsets as part of other content presentation processes. The online concierge system only presents prioritized items to users in the remainder subsets of the test set and the control set.

The online concierge system tracks user interactions with items in an item group and computes four interaction metrics based on the user interactions with items in an item group. The first interaction metric represents a level of interaction by users in the holdout subset of the test set, the second interaction metric represents a level of interaction by users in the remainder subset of the test set, the third interaction metric represents a level of interaction by users in the holdout subset of the control set, and the fourth interaction metric represents a level of interaction by users in the remainder subset of the control set. The online concierge system uses these interaction metrics to compute a group lift score for the item group. A group lift score for an item group represents a change in the level of interaction by users with items in the item group when the online concierge system uses the test feature as compared to when the online concierge system does not use the test feature to present prioritized items.

The online concierge system computes group lift scores for each of the set of item groups, and generates an aggregated lift score for the test feature based on the group lift scores. In some embodiments, the online concierge system also computes a confidence interval for the aggregated lift score by applying jackknife estimation. The online concierge system may present items to users based on the aggregated lift score and the computed confidence interval.

By generating group lift scores that evaluate the performance of prioritized items in item groups, the online concierge system generates a metric that more accurately reflects how a test feature impacts the efficacy creating item groups and presenting prioritized items from item groups. The online concierge system can thereby determine whether algorithms or models that reduce the computational load on the online concierge system perform well enough to be used by the online concierge system on all users, rather than just a test set. Therefore, the aggregated lift score can improve the functionality of the online concierge system by reducing the computational resources required to present content to users.

DETAILED DESCRIPTION

Figure 1:
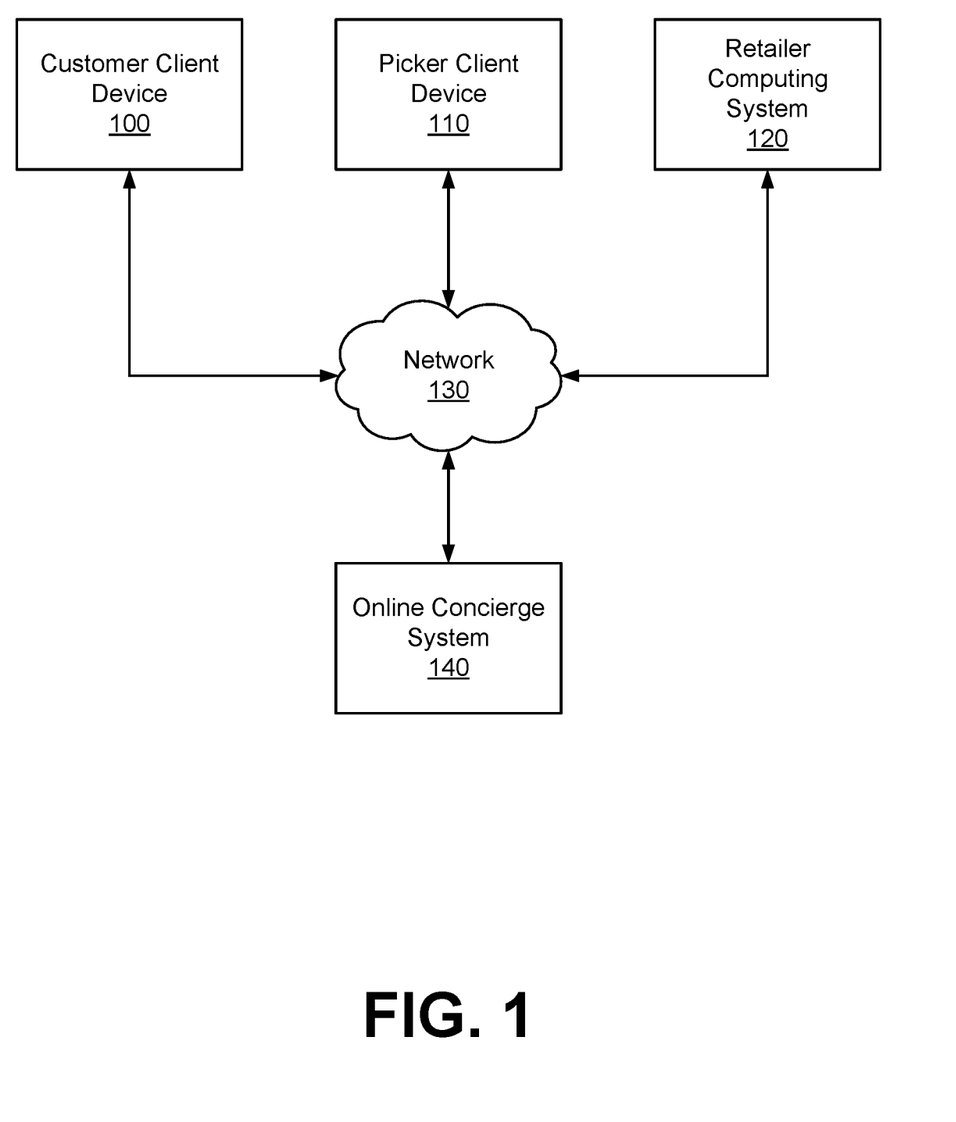
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
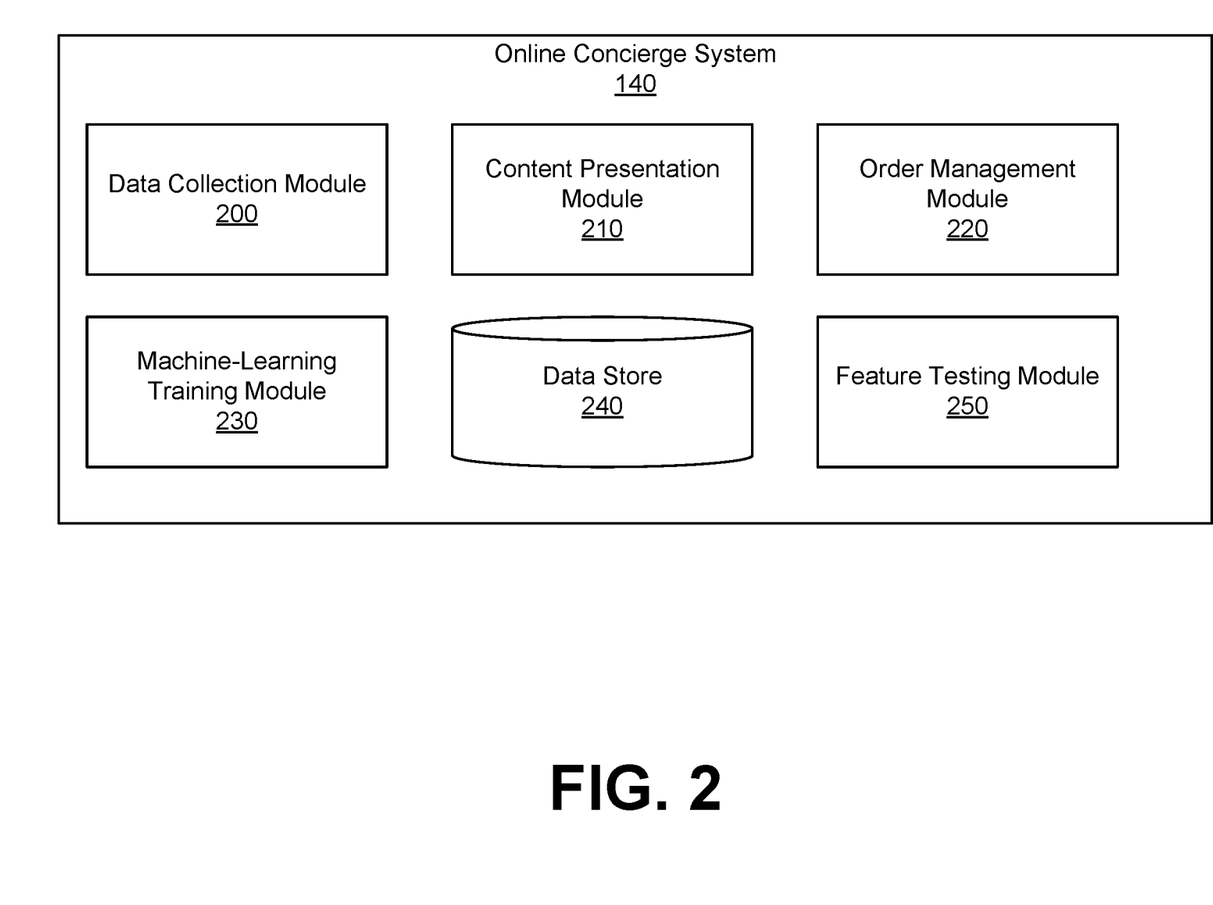
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140.

The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The feature testing module 250 tests new features for the online concierge system. As the online concierge system is maintained and updated, a new feature for selecting items to present to customers will be added to the online concierge system. This new feature may be a new algorithm, a new model (e.g., machine-learning model), or new parameters for controlling how items are presented to customers. However, before the new feature is added, the feature testing module 250 tests the feature by determining how well the new feature improves user interactions with items in a set of item groups to generate an aggregated lift score across that set of item groups. The generation of an aggregated lift score for a test feature is described in further detail below.

Figure 3:
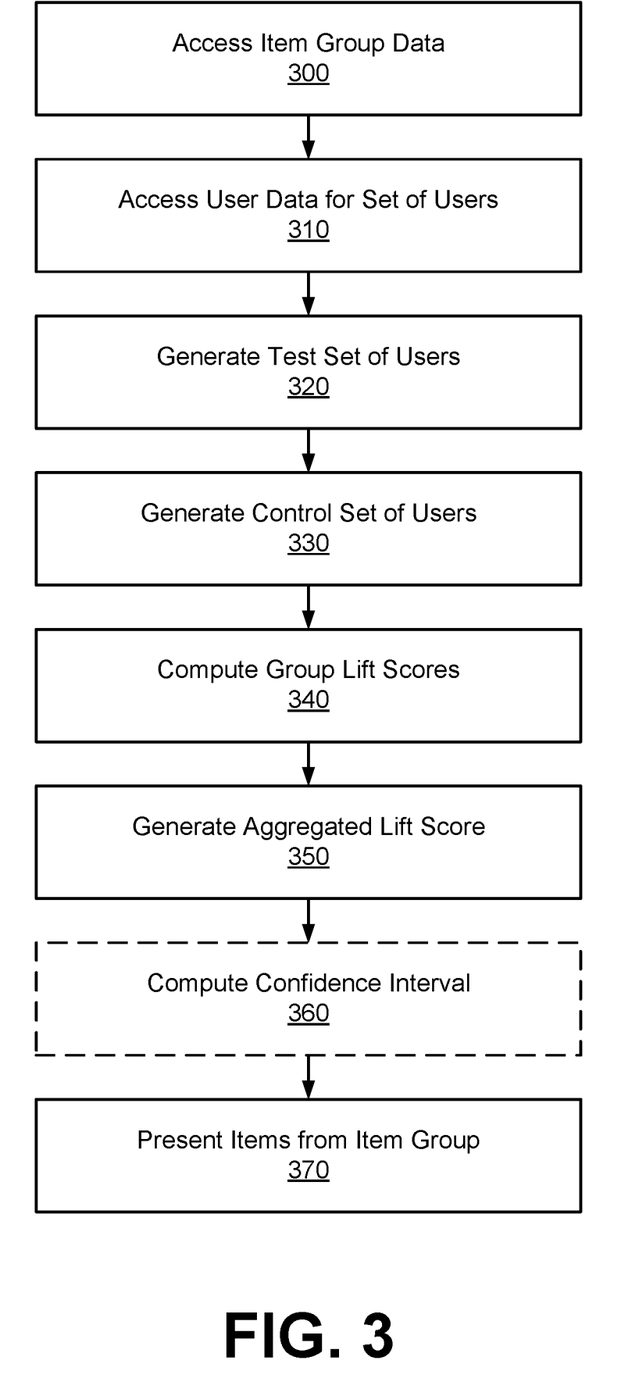
FIG. 3 is a flowchart for a method of generating an aggregated lift score for a test feature for an online concierge system, in accordance with some embodiments.

FIG. 3 is a flowchart for a method of generating an aggregated lift score for a test feature for an online concierge system, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system accesses 300 item group data describing a set of item groups. An item group is a set of items to be presented to users of the online system. An item group may include items that are offered by a particular item provider (e.g., a brand for the item or an entity that produces the item). The online concierge system may select items in item groups to be presented as prioritized items. Prioritized items are items that are in item groups and are prioritized relative to other items presented to a user. For example, prioritized items may be presented at the beginning of a list of items presented to a user, or may be highlighted by the online concierge system when presented to the user. Prioritized items are generally presented with an indication that the prioritized item has been prioritized. For example, a prioritized item may be presented with an indicator like "new," "special," "promoted," "sponsored," or "advertisement."

The item group data describes characteristics of the item groups. Item group data includes item data describing characteristics of the items that are part of the item group. Additionally, the item group data includes information describing how the items should be presented to users. For example, the item group data may include instructions on how often items should be presented to users, characteristics of users to whom items in the item group should be presented, or whether and how items in the item group should be prioritized for presentation to users. In some embodiments, the item group data indicates whether the item provider has provided consideration to the online concierge system to sponsor items to be displayed to users. In these embodiments, the item group data may include how much consideration the item provider has provided, a minimum or maximum amount of consideration that should be used for an item to be presented to a user, or a minimum or maximum amount of consideration that the online concierge system should use over a period of time.

The online concierge system accesses 310 user data describing characteristics of a set of users of the online concierge system. The set of users may include customers who order items from the online concierge system or may include pickers who service orders for the online concierge system.

The online concierge system generates 320 a test set of users and generates 330 a control set of users for a test feature. A test feature is a possible change to one or more algorithms, models, or parameters used by the online concierge system to present items to users. The online concierge system performs a test of the test feature by using the test feature to present items to the test set of users and by not using the test feature (i.e., using existing algorithms, models, or parameters) to present items to the control set of users. The online concierge system generates the test set of users by randomly selecting a subset of the set of users, and generates the control set of users from the subset of users who were not selected for the test set of users.

The online concierge system presents prioritized items from the set of item groups to the users in the test set of users and the control set of users. However, the online concierge system does not present prioritized items to users in holdout subsets of the test set of users and the control set of users. The holdout subset is a randomly selected subset of the test set of users or the control set of users to whom no prioritized items are presented. The online concierge system may select a different holdout subset of the test set and the control set for each item group. Thus, a user may be in a holdout subset for prioritized items from one item group but not for another item group.

The online concierge system measures user interactions with items in the set of item groups to generate user interaction data. The online concierge system computes 340 a set of group lift scores for the set of item groups based on the user interaction data. A group lift score for an item group represents an improvement in an interaction metric for items in the item group based on the test feature. The interaction metric is a metric that represents a level of interaction with items for an item group. For example, the interaction metric for an item group may be the number of items from the item group ordered by users, a total value of items from the item group ordered by the users, a percentage of the users who ordered items from the item group, or some combination thereof. The online concierge system computes the interaction metric based on user interaction data from the users over a period of time during which the test feature is tested by the online concierge system.

To compute the group lift score for an item group, the online concierge system computes a test lift score for the test set of users and a control lift score for the control set of users. The test lift score represents the lift of the test set of users based on the test feature. The test lift score is computed based on a first interaction metric and a second interaction metric. The first interaction metric is an interaction metric computed based on user interaction data from the holdout subset of the test set of users. Thus, the first interaction metric represents a baseline level of interaction by the test set of users with items in the item group when the items are not presented as prioritized items. The second interaction metric is an interaction metric computed based on interaction data from the remainder subset of the test set of users (i.e., those users not in the holdout subset). The second interaction metric therefore represents the level of interaction by the test set of users with items in the item group when the items are presented as prioritized items using the test feature.

To compute the test lift score, the online concierge system compares the first interaction metric corresponding to the holdout subset to the second interaction metric corresponding to the remainder subset. For example, the online concierge system may compute a difference between the first interaction metric and the second interaction metric to compute the test lift score. Similarly, the test lift score may be a ratio of the second interaction metric to the first interaction metric.

The online concierge system computes the control lift score through a similar process. The control lift score represents the lift of the control set of users based on the existing functionality of the online concierge system. The control lift score is computed based on a third interaction metric and a fourth interaction metric. The third interaction metric is an interaction metric computed based on the holdout subset of the set of control users. Thus, the third interaction metric represents a baseline level of interaction by users in the control set of users. Also like for the test set of users, the fourth interaction metric is an interaction metric computed based on the remainder subset of the control set of users (i.e., those users not in the holdout subset). The fourth interaction metric therefore represents the level of interaction by the control set of users with items in the item group when the items are presented as prioritized items without using the test feature.

To compute the control lift score, the online concierge system compares the third interaction metric corresponding to the holdout subset to the fourth interaction metric corresponding to the remainder subset. For example, the online concierge system may compute a difference between the third interaction metric and the fourth interaction metric to compute the control lift score. Similarly, the control lift score may be a ratio of the fourth interaction metric to the third interaction metric.

The online concierge system computes the group lift score for an item group based on the test lift score and the control lift score computed for the item group. For example, the group lift score may be the difference between the test lift score and the control lift score.

The online concierge system generates 350 an aggregated lift score for the test feature based on the group lift scores computed for the set of item groups. An aggregated lift score represents a change in a level of interaction of users with items across all item groups based on the test feature. For example, the aggregated lift score may represent an increase (or decrease) in lift when the online concierge system uses the test feature to present items to users instead of the online concierge system's existing functionality. The aggregated score may simply be a sum of the group lift scores, or an average of the group lift scores. In some embodiments, the aggregated lift score is a weighted average of the group lift scores for the item groups, wherein the group lift scores are weighted based on characteristics of the item groups. In embodiments where item providers for the item groups provided consideration to sponsor the presentation of items in their item groups, the group lift scores for items may be weighted based on an amount of consideration provided by the item provider for use during the period of time when the test feature was tested.

In some embodiments, the online concierge system computes 360 a confidence interval for the aggregated lift score using Jackknife estimation. In these embodiments, the online concierge system separates the set of users into a set of N user buckets for some positive integer N. Each user bucket comprises a distinct subset of users of the set of users (e.g., no user of the set of users is in more than one user bucket). The online concierge system computes a set of N aggregated lift scores. Each of the N aggregated lift scores is computed based on a subset of the set of users that excludes one of the N user buckets. In other words, the online concierge system computes aggregated lift scores based on different subsets of the set of users, where a subset used for an aggregated lift score excludes a different subset of the set of users. The online concierge system computes the confidence interval for the aggregated lift score based on this set of aggregated lift scores. Note that, while the online concierge system generates the set of aggregated lift scores for computing the confidence interval based on subsets of the set of users, the online concierge system uses the full set of users, as described above, to compute an aggregated lift score for the test feature.

The online concierge system presents 370 an item from an item group based on the generated aggregated lift score for the test feature. For example, the online concierge system may continue to use the test feature for the presentation of items from item groups if the aggregated lift score exceeds a threshold. In some embodiments, the online concierge system presents an item from an item group based on the computed confidence interval for the aggregated lift score.

Figure 4:
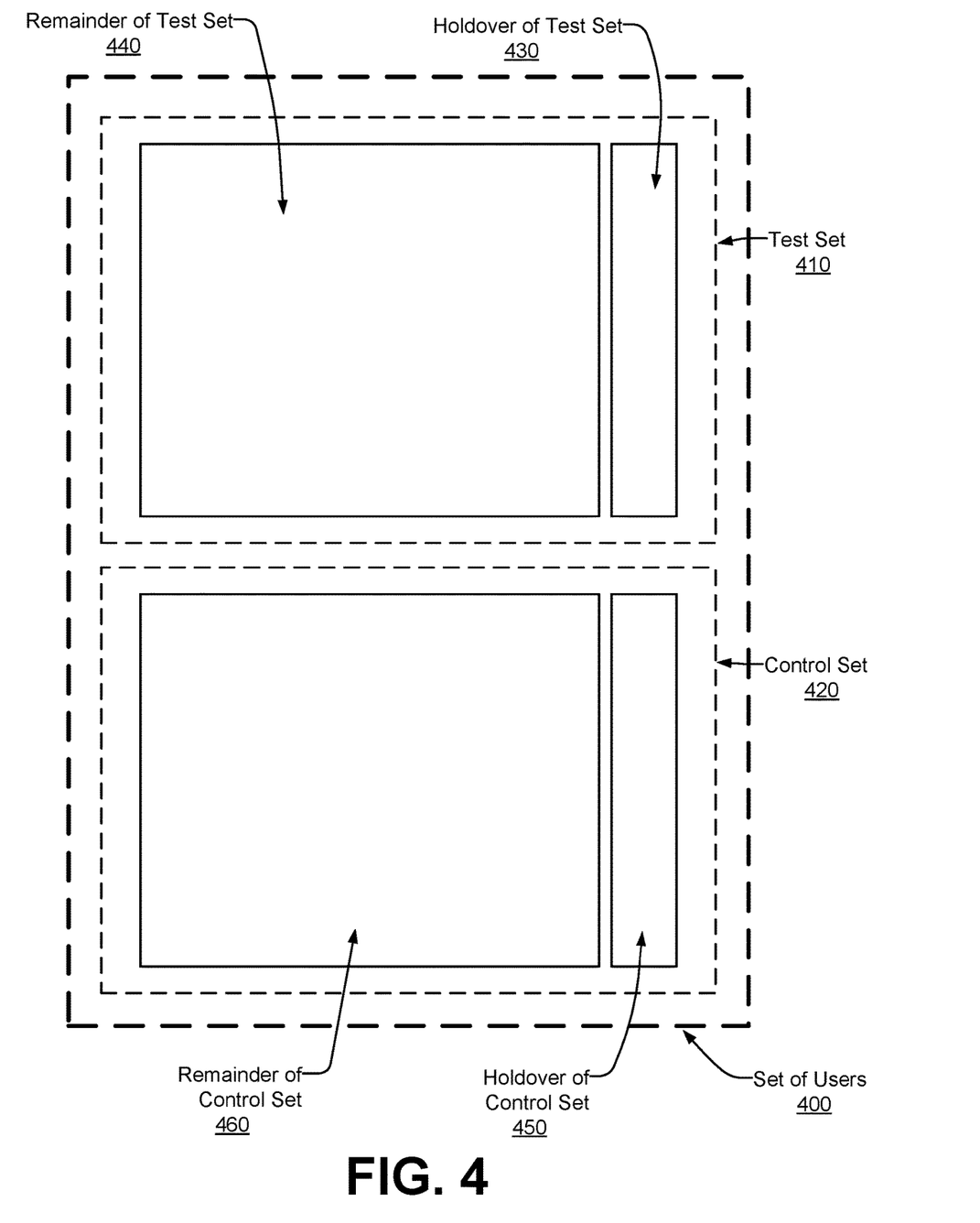
FIG. 4 illustrates an example separation of a set of users into a test set of users and a control set of users, in accordance with one or more embodiments.

FIG. 4 illustrates an example separation of a set of users 400 into a test set of users 410 and a control set of users 420, in accordance with some embodiments. As explained above, to generate the test lift score for an item group, the online concierge system generates subsets of the test set 410 and the control set 420. The test set of users 410 is separated into a holdover subset 430 and a remainder subset 440. As described above, the online concierge system presents prioritized items from the item group to the remainder subset 440 using the test feature. The online concierge system does not present prioritized items from the item group to the holdover subset 430. Similarly, the control set of users 420 is separated into a holdover subset 450 and a remainder subset 460. The online concierge system presents prioritized items from the item group to the remainder subset 460 without using the test feature, and does not present items from the item group to the holdover subset 450.

Figure 5:
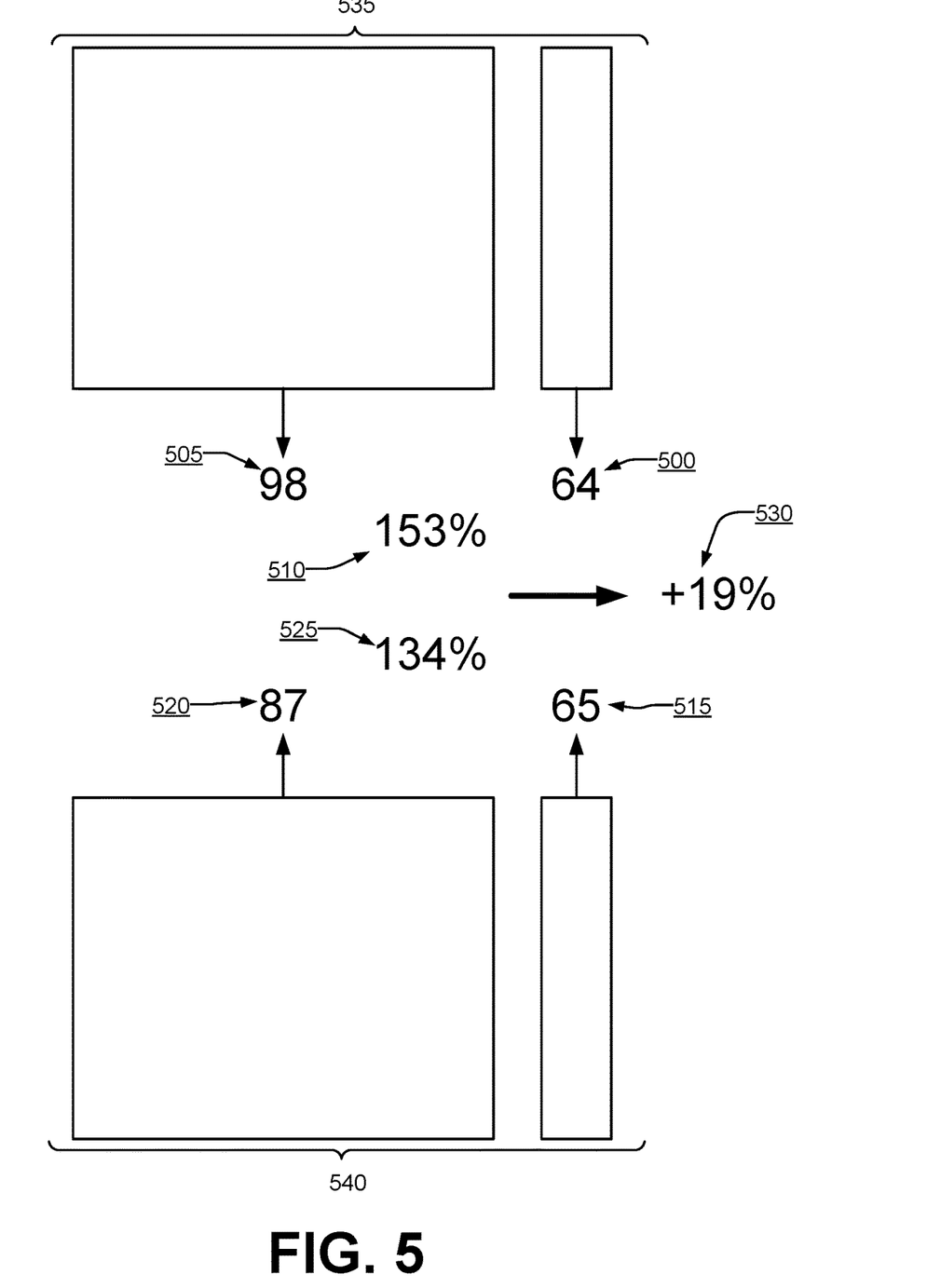
FIG. 5 illustrates an example group lift score computed for an item group, in accordance with one or more embodiments.

FIG. 5 illustrates an example group lift score 530 computed for an item group, in accordance with some embodiments. The online concierge system computes a first interaction metric 500 based on a holdover subset for the test set of users 535, and a second interaction metric 505 for the remainder subset. The online concierge system uses these metrics to compute a test lift score 510 for the item group. Similarly, the online concierge system computes a third interaction metric 515 based on a holdover subset for the control set of users 540, and a fourth interaction metric 520 for the remainder subset. The online concierge system uses these metrics to compute a control lift score 525 for the item group. In the embodiment illustrated in FIG. 5, the test lift score 510 is the ratio (expressed as a percentage) of the second interaction metric 505 to the first interaction metric 500. Similarly, the control lift score 525 is the ratio of the fourth interaction metric 520 to the third interaction metric 515.

The online concierge system computes a group lift score 530 for the item group based on the test lift score 510 and the control lift score 525. In the embodiment illustrated in FIG. 5, the group lift score 530 is the difference between the test lift score 510 and the control lift score 525.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

accessing, by an online system, item group data for a set of item groups, wherein each item group comprises a set of items to be presented to users of the online system as prioritized items, and wherein each item group comprises items provided by an item provider;

accessing, by the online system, user data describing characteristics of a set of users from a database storing user data;

generating, by the online system, a test set of users for a test feature of the online system by randomly selecting a subset of the set of users based on the accessed user data, wherein the test feature is a new feature being tested for use by the online system to present items to users, wherein the new feature comprises a new machine-learning model trained to calculate scores for item groups representing predicted likelihoods of interaction by users with the item groups through the online system;

generating, by the online system, a control set of users for the test feature from a subset of the set of users who were not randomly selected for the test set of users;

computing, by the online system, a set of group lift scores, wherein each group lift score corresponds to an item group of the set of item groups, wherein the group lift score for an item group represents a change in a level of interaction by users with items from the item group, wherein computing a group lift score for an item group comprises:

transmitting, by the online system over a network, the set of items from the item group to client devices associated with users in the test set of users, wherein the set of items are not presented as prioritized items to a holdout subset of the test set of users, and wherein the set of items are presented, using the test feature, as prioritized items to a remainder subset of the test set of users, wherein transmitting the set of items comprises:

applying the new machine-learning model of the test feature to user data associated with a test user in the test set of users to generate a set of scores for the set of items, and transmitting instructions to a client device associated with the test user to display the set of items, wherein the instructions cause the client device associated with the test user to present a graphical user interface that displays content relating to the set of items on a display of the client device associated with the test user;

transmitting, by the online system over a network, the set of items from the item group to client devices associated with users in the control set of users for presenting to the users through displays of the client devices, wherein the set of items are not presented as prioritized items to a holdout subset of the control set of users, and wherein the set of items are presented, without using the test feature, as prioritized items to a remainder subset of the control set of users, wherein transmitting the set of items comprises:

applying an old machine-learning model stored by the online system to user data associated with a control user in the control set of users to generate a set of scores for the set of items, and transmitting instructions to a client device associated with the control user to display the set of items, wherein the instructions cause the client device associated with the control user to present a graphical user interface that displays content relating to the set of items on a display of the client device associated with the control user;

measuring interaction data describing interactions with the set of items by users in the test set of users and the control set of users by:

receiving, by the online system, logged data from the client device of the test user describing interactions by the test user with the graphical user interface presented to the test user on the display of the client device of the test user, and receiving, by the online system, logged data from the client device of the control user describing interactions by the control user with the graphical user interface presented to the control user on the display of the client device of the control user;

computing a test lift score for the test set of users based on the interaction data;

computing a control lift score for the control set of users based on the interaction data; and comparing the test lift score to the control lift score;

generating an aggregated lift score for the test feature based on the group lift scores for the set of item groups; and presenting an item from an item group of the set of item groups based on the aggregated lift score for the test feature.

2. The method of claim 1, further comprising:

computing a confidence interval for the aggregated lift score by applying jackknife estimation to the set of group lift scores generated for the set of item groups.

3. The method of claim 2, wherein applying jackknife estimation to the set of group lift scores comprises: generating a set of user buckets based on the set of users, wherein each user bucket of the set of user buckets comprises a distinct subset of the set of users; computing a set of aggregated lift scores, wherein each aggregated lift score of the set of aggregated lift scores is computed based on a subset of the set of users that excludes a different user bucket of the set of user buckets; and computing a confidence interval for the generated aggregated lift score based on the set of aggregated lift scores.

4. The method of claim 1, wherein computing a test lift score for an item group comprises:

computing a first interaction metric based on the interaction data, wherein the first interaction metric represents a level of interaction by users in the holdout subset of the test set of users with the set of items in the item group;

computing a second interaction metric based on the interaction data, wherein the second interaction metric represents a level of interaction by users in the remainder subset of the test set of users with the set of items in the item group; and comparing the first interaction metric to the second interaction metric.

5. The method of claim 4, wherein computing a control lift score for an item group comprises:

computing a third interaction metric based on the interaction data, wherein the third interaction metric represents a level of interaction by users in the holdout subset of the control set of users with the set of items in the item group;
computing a fourth interaction metric based on the interaction data, wherein the fourth interaction metric represents a level of interaction by users in the remainder subset of the control set of users with the set of items in the item group; and
comparing the third interaction metric to the fourth interaction metric.

6. The method of claim 5, wherein:
computing the test lift score for the test set of users comprises:
computing a ratio of the second interaction metric to the first interaction metric; and
computing the control lift score for the control set of users comprises:
computing a ratio of the fourth interaction metric to the third interaction metric.

7. The method of claim 1, wherein presenting the set of items as prioritized items to the remainder subset of the test set of users comprises:
presenting an item of the set of items with an indication that the item is a prioritized item.

8. The method of claim 1, wherein the test feature comprises a new algorithm, a new model, or new parameters.

9. The method of claim 1, wherein comparing the test lift score to the control lift score comprises:
computing a difference between the test lift score and the control lift score.

10. The method of claim 1, wherein generating the aggregated lift score based on the group lift scores for the set of item groups comprises:
computing a weighted average of the group lift scores for the set of item groups.

11. A non-transitory computer-readable medium storing instructions that, when executed by a processor, cause the processor to:
access, by an online system, item group data for a set of item groups, wherein each item group comprises a set of items to be presented to users of the online system as prioritized items, and wherein each item group comprises items provided by an item provider;
access, by the online system, user data describing characteristics of a set of users from a database storing user data;
generate, by the online system, a test set of users for a test feature of the online system by randomly selecting a subset of the set of users based on the accessed user data, wherein the test feature is a new feature being tested for use by the online system to present items to users, wherein the new feature comprises a new machine-learning model trained to calculate scores for item groups representing predicted likelihoods of interaction by users with the item groups through the online system;
generate, by the online system, a control set of users for the test feature from a subset of the set of users who were not randomly selected for the test set of users;
compute, by the online system, a set of group lift scores, wherein each group lift score corresponds to an item group of the set of item groups, wherein the group lift score for an item group represents a change in a level of interaction by users with items from the item group, wherein computing a group lift score for an item group comprises:

transmitting, by the online system over a network, the set of items from the item group to client devices associated with users in the test set of users, wherein the set of items are not presented as prioritized items to a holdout subset of the test set of users, and wherein the set of items are presented, using the test feature, as prioritized items to a remainder subset of the test set of users, wherein transmitting the set of items comprises:
applying the new machine-learning model of the test feature to user data associated with a test user in the test set of users to generate a set of scores for the set of items, and
transmitting instructions to a client device associated with the test user to display the set of items, wherein the instructions cause the client device associated with the test user to present a graphical user interface that displays content relating to the set of items on a display of the client device associated with the test user;
transmitting, by the online system over a network, the set of items from the item group to client devices associated with users in the control set of users for presenting to the users through displays of the client devices, wherein the set of items are not presented as prioritized items to a holdout subset of the control set of users, and wherein the set of items are presented, without using the test feature, as prioritized items to a remainder subset of the control set of users, wherein transmitting the set of items comprises:
applying an old machine-learning model stored by the online system to user data associated with a control user in the control set of users to generate a set of scores for the set of items, and
transmitting instructions to a client device associated with the control user to display the set of items, wherein the instructions cause the client device associated with the control user to present a graphical user interface that displays content relating to the set of items on a display of the client device associated with the control user;
measuring interaction data describing interactions with the set of items by users in the test set of users and the control set of users by:
receiving, by the online system, logged data from the client device of the test user describing interactions by the test user with the graphical user interface presented to the test user on the display of the client device of the test user, and
receiving, by the online system, logged data from the client device of the control user describing interactions by the control user with the graphical user interface presented to the control user on the display of the client device of the control user;
computing a test lift score for the test set of users based on the interaction data;
computing a control lift score for the control set of users based on the interaction data; and
comparing the test lift score to the control lift score;
generate an aggregated lift score for the test feature based on the group lift scores for the set of item groups; and
present an item from an item group of the set of item groups based on the aggregated lift score for the test feature.

12. The computer-readable medium of claim 11, further storing instructions that cause the processor to:

compute a confidence interval for the aggregated lift score by applying jackknife estimation to the set of group lift scores generated for the set of item groups.

13. The computer-readable medium of claim 12, wherein the instructions for applying jackknife estimation to the set of group lift scores comprise instructions that cause the processor to:
generate a set of user buckets based on the set of users, wherein each user bucket of the set of user buckets comprises a distinct subset of the set of users;
compute a set of aggregated lift scores, wherein each aggregated lift score of the set of aggregated lift scores is computed based on a subset of the set of users that excludes a different user bucket of the set of user buckets; and
compute a confidence interval for the generated aggregated lift score based on the set of aggregated lift scores.

14. The computer-readable medium of claim 11, wherein the instructions for computing a test lift score for an item group comprise instructions that cause the processor to:
compute a first interaction metric based on the interaction data, wherein the first interaction metric represents a level of interaction by users in the holdout subset of the test set of users with the set of items in the item group;
compute a second interaction metric based on the interaction data, wherein the second interaction metric represents a level of interaction by users in the remainder subset of the test set of users with the set of items in the item group; and
compare the first interaction metric to the second interaction metric.

15. The computer-readable medium of claim 14, wherein the instructions for computing a control lift score for an item group comprise instructions that cause the processor to:
compute a third interaction metric based on the interaction data, wherein the third interaction metric represents a level of interaction by users in the holdout subset of the control set of users with the set of items in the item group;
compute a fourth interaction metric based on the interaction data, wherein the fourth interaction metric represents a level of interaction by users in the remainder subset of the control set of users with the set of items in the item group; and
compare the third interaction metric to the fourth interaction metric.

16. The computer-readable medium of claim 15, wherein:
the instructions for computing the test lift score for the test set of users comprise instructions that cause the processor to:
compute a ratio of the second interaction metric to the first interaction metric; and
the instructions for computing the control lift score for the control set of users comprise instructions that cause the processor to:
compute a ratio of the fourth interaction metric to the third interaction metric.

17. The computer-readable medium of claim 11, wherein the instructions for presenting the set of items as prioritized items to the remainder subset of the test set of users comprise instructions that cause the processor to:
present an item of the set of items with an indication that the item is a prioritized item.

18. The computer-readable medium of claim 11, wherein the test feature comprises a new algorithm, a new model, or new parameters.

19. The computer-readable medium of claim 11, wherein the instructions for comparing the test lift score to the control lift score comprise instructions that cause the processor to:
compute a difference between the test lift score and the control lift score.

20. A system comprising:
a processor; and
a non-transitory computer-readable medium storing instructions that, when executed by the processor, cause the processor to:
access, by an online system, item group data for a set of item groups, wherein each item group comprises a set of items to be presented to users of the online system as prioritized items, and wherein each item group comprises items provided by an item provider;
access, by the online system, user data describing characteristics of a set of users from a database storing user data;
generate, by the online system, a test set of users for a test feature of the online system by randomly selecting a subset of the set of users based on the accessed user data, wherein the test feature is a new feature being tested for use by the online system to present items to users, wherein the new feature comprises a new machine-learning model trained to calculate scores for item groups representing predicted likelihoods of interaction by users with the item groups through the online system;
generate, by the online system, a control set of users for the test feature from a subset of the set of users who were not randomly selected for the test set of users;
compute, by the online system, a set of group lift scores, wherein each group lift score corresponds to an item group of the set of item groups, wherein the group lift score for an item group represents a change in a level of interaction by users with items from the item group, wherein computing a group lift score for an item group comprises:
transmitting, by the online system over a network, the set of items from the item group to client devices associated with users in the test set of users, wherein the set of items are not presented as prioritized items to a holdout subset of the test set of users, and wherein the set of items are presented, using the test feature, as prioritized items to a remainder subset of the test set of users, wherein transmitting the set of items comprises:
applying the new machine-learning model of the test feature to user data associated with a test user in the test set of users to generate a set of scores for the set of items, and
transmitting instructions to a client device associated with the test user to display the set of items, wherein the instructions cause the client device associated with the test user to present a graphical user interface that displays content relating to the set of items on a display of the client device associated with the test user;
transmitting, by the online system over a network, the set of items from the item group to client devices associated with users in the control set of users for presenting to the users through displays of the client devices, wherein the set of items are not presented as prioritized items to a holdout subset of the control set of users, and wherein the set of items are presented, without using the test feature, as prioritized items to a remainder subset of the control set of users, wherein transmitting the set of items comprises:
applying an old machine-learning model stored by the online system to user data associated with a control user in the control set of users to generate a set of scores for the set of items, and
transmitting instructions to a client device associated with the control user to display the set of items, wherein the instructions cause the client device associated with the control user to present a graphical user interface that displays content relating to the set of items on a display of the client device associated with the control user;
measuring interaction data describing interactions with the set of items by users in the test set of users and the control set of users by:
receiving, by the online system, logged data from the client device of the test user describing interactions by the test user with the graphical user interface presented to the test user on the display of the client device of the test user, and
receiving, by the online system, logged data from the client device of the control user describing interactions by the control user with the graphical user interface presented to the control user on the display of the client device of the control user;
computing a test lift score for the test set of users based on the interaction data;
computing a control lift score for the control set of users based on the interaction data; and
comparing the test lift score to the control lift score;
generate an aggregated lift score for the test feature based on the group lift scores for the set of item groups; and
present an item from an item group of the set of item groups based on the aggregated lift score for the test feature.

* * * * *